United States Patent [19]

Smart

[11] 4,241,119
[45] Dec. 23, 1980

[54] DIMENSIONALLY HEAT-UNSTABLE PRODUCTS

[75] Inventor: Normaan E. Smart, Welwyn Garden City, England

[73] Assignee: The Post Office, London, England

[21] Appl. No.: 759,753

[22] Filed: Jan. 17, 1977

[30] Foreign Application Priority Data

Jan. 22, 1976 [GB] United Kingdom ............... 2573/76

[51] Int. Cl.² .................... B32B 1/08; B32B 3/10
[52] U.S. Cl. .................... 428/36; 174/DIG. 8;
156/86; 285/381; 285/DIG. 10; 403/28;
428/134; 428/139; 428/172; 428/192; 428/913
[58] Field of Search ............ 403/27, 270, 28, 265;
156/86, 64; 285/381, DIG. 10, 21, 423, 93;
428/913, 156, 192, 121, 132, 133, 134, 36, 172;
264/175, 176 R, 177 R, 209; 174/DIG. 8

[56] References Cited

U.S. PATENT DOCUMENTS

| 719,817 | 2/1903 | Kunze | 24/25 |
|---|---|---|---|
| 2,073,338 | 3/1937 | Durkee | 24/25 |
| 2,739,089 | 3/1956 | Hageltorn | 428/121 |
| 2,960,561 | 11/1960 | Plummer | 428/99 |
| 3,455,336 | 7/1969 | Ellis | 174/DIG. 8 |
| 3,574,313 | 4/1971 | Tanaka | 174/DIG. 8 |
| 3,899,807 | 8/1975 | Sorish et al. | 156/86 |
| 3,957,382 | 5/1976 | Greul, Jr. et al. | 156/86 |

FOREIGN PATENT DOCUMENTS 1947057 3/1970 Fed. Rep. of Germany .... 174/DIG. 8
1266719 3/1972 United Kingdom .

Primary Examiner—Stanley S. Silverman
Attorney, Agent, or Firm—Hall & Houghton

[57] ABSTRACT

The invention relates to a shrinkable sleeve device easily assembled with a body to be protected thereby. It comprises a dimensionally heat unstable sheet-like portion to embrace the body with unique means for securing edge portions thereof together. The device is particularly advantageous for application and use in restricted locations and for providing a protective sleeve by which cable ducts will not be unduly impeded.

6 Claims, 5 Drawing Figures

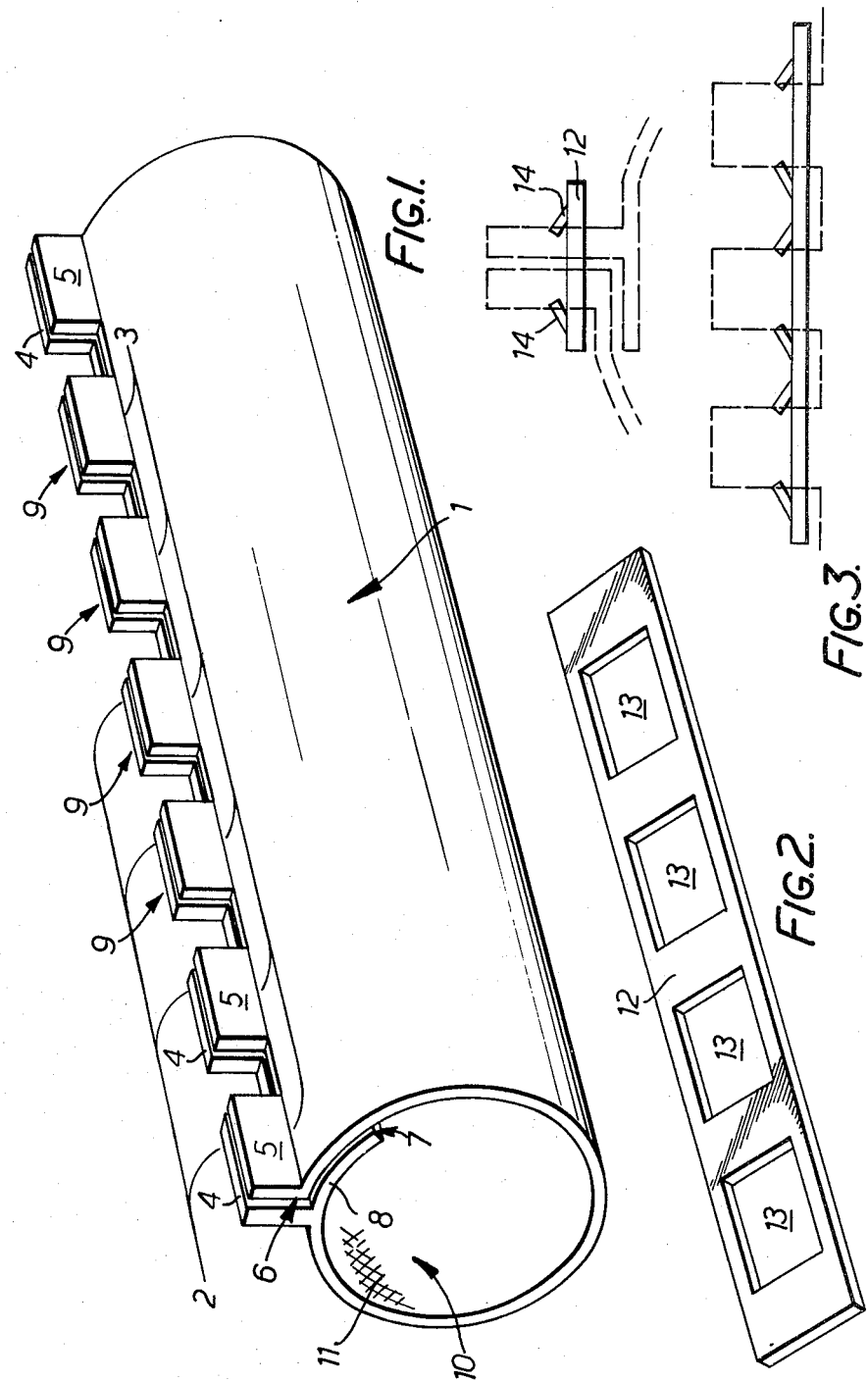

DIMENSIONALLY HEAT-UNSTABLE PRODUCTS

This invention relates to products formed of dimensionally heat-unstable plastics material and to methods of forming such products. The invention is concerned particularly with preformed plastics sheet products which can be readily disposed about a body to be protected, sealed or closely covered for any other purpose, by drawing edges of the sheet material together and securely fastening them and applying heat to shrink the dimensionally heat-unstable material over the body surface.

Such products made in the configuration of longitudinally split sleeves are especially useful in the repair of polyethylene sheathed cable, where, following removal of a section of sheathing, for example, in order to effect conductor maintenance, it is desired to replace the removed sheathing section by sheath material having the same sealing and protecting properties as the original sheath. To ensure such sleeves seal tightly over the original sheath end parts and the exposed cable interior, it is necessary that a closure joining the edges of the split sleeve should not fail during the shrinkdown process. To this end the following closures have been proposed.

In an early closure device, the heat-shrinkable longitudinally split sleeve has a series of buttons adjacent one edge with a series of cooperating holes adjacent its other edge, the buttons being pressed into the holes prior to application of heat so as to keep the edges together when the sleeve is heated. Such a sleeve proved to have good resistance to circumferential separation and relative longitudinal movement of the edges but does not really combat radial separation should the cable interior be irregularly shaped and so subject the sleeve edges to differential pressures during the shrinkdown process.

In a later closure device, preformed edges of the sleeve butt together to form a single longitudinally extending ridge having a cross-section which is thin or necked down near the sleeve proper and thick or bulbous further from it. To close the sleeve a C-section rigid strip is slid over the ridge from one end, the strip being so shaped that the C encloses the bulbous part of the ridge. It is considered that the necked down portion represents an undesirable weakness in the closure. In addition, though this closure provides effective resistance against circumferential and radial separation it is susceptible to relative longitudinal movement of the edges. This has occasioned a further fabrication step, i.e. shaping the facing portions of the ridge by serrations.

According to one aspect of the invention there is provided dimensionally heat-unstable, stock sheet material for use in making split sleeves, said material having a pair of opposed edges, one longitudinally extending series of upwardly projecting posts at one edge and another longitudinally extending series of upwardly projecting posts adjacent the other edge, said posts being so formed that when the stock material is formed into said sleeve, respective posts abut and are held in abutment by closure means acting between adjacent posts.

According to another aspect of the invention there is provided dimensionally heat-unstable, stock sheet material for use in making split sleeves, said material having a pair of opposed edges, one longitudinally extending series of upwardly projecting posts at one edge and another longitudinally extending series of upwardly projecting posts adjacent the other edge, said posts being so formed that when the stock material is formed into said sleeve respective posts abut to produce a series of outwardly projecting pillars extending along the sleeve.

For use with such stock material, the invention further includes a fixing strip of rigid material, said strip being apertured along its length at regions spaced and shaped to correspond to the spacing and shape of said pillars, said strip being locatable over the series of pillars so that each pillar fits snugly in an aperture thereby to maintain pairs of posts in abutting relationship.

Preferably said pillars and apertures are rectangular. The pillars can be equispaced along the stock material with said apertures equispaced along the strip material. The bounding edges of the apertures are preferably struck up from the plane of the strip material.

Said dimensionally heat un-stable material can be adapted to shrink in a plane perpendicular to its length when heat is applied thereto. Said stock material can have an edge flap adjacent said other series of posts, which flap is locatable radially inwardly of said one edge when said posts are brought into abutting relationship.

Preferably a surface of the stock material has a coating of thermo-active adhesive.

According to another aspect of the invention there is provided a first method of producing the stock material hereinbefore defined comprising:

forming molten plastics into flat sheet material having a pair of elongate flanges by forcing the molten plastics between a pair of rollers one of said rollers being grooved to shape the flanges; conditioning the plastics to make it dimensionally heat unstable; and following cooling of the moving plastics, stamping portions from said flanges using a reciprocating ram thereby to produce two series of castellations.

In a second method according to the invention the stock material is produced by a method comprising:

extruding molten plastics into tubular form using an extrusion die so shaped that the tubular material is formed with a longitudinal flange extending inwardly of a thickened longitudinal region of the tubular material wall;

operating from inside the tubular material, periodically cross-cutting the flange and stamping out alternate portions thereof and slitting the tubular material generally centrally of the flange parts to a predetermined depth;

and operating outside the tubular material, slitting said thickened longitudinal region so as to cleave the material by an L-section cut. The tubular material can then be turned inside-out to produce a dimensionally heat unstable split sleeve.

Embodiments of the invention will now be described by way of example with reference to the accompanying drawings in which:

FIG. 1 is a perspective view of one form of dimensionally heat-unstable split sleeve according to the invention;

FIG. 2 is a perspective view of a fixing strip for use with a sleeve of FIG. 1;

FIG. 3 is a sectional view showing the split sleeve closed by the fixing strip;

Figure 4:
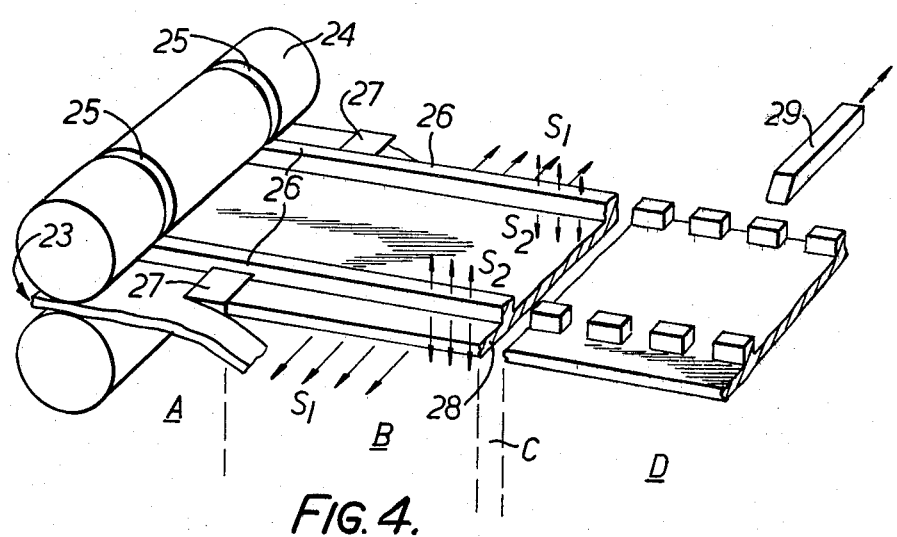
FIG. 4 shows consecutive stages in a method for producing the sleeve of FIG. 1.

Referring to the drawings in detail, FIG. 1 shows a sleeve 1 fabricated in polyethylene which has been conditioned by a process making it dimensionally heat-unstable to the extent that the sleeve 1 is susceptible to circumferential shrinkage when heat is applied to it.

Generally, such conditioning of materials exhibiting the property of elastic or plastic memory is achieved by heating the material above its crystalline melting point, stretching it in a predetermined direction, and cooling it while maintaining the material in its stretched condition. Subsequently, when the relaxed material is reheated above its crystalline melting point it will restore to its original area and thickness dimensions.

The sleeve 1 has two series 2 and 3 of outwardly-projecting rectangular-sectioned equispaced posts 4 and 5. One series 3 extends along one edge 6 while the other series 2 is spaced from the other edge 7. The sleeve is of regular tubular form, and when respective outstanding posts 4 and 5 are brought together, a flap 8 locates under the edge 6 in juxtaposition to the inside surface of the sleeve adjacent to the edge 6, as best shown in FIG. 1 and the posts 4 and 5 abut in pairs producing a line of rectangular pillars 9. The inside surface of the sleeve 10 and both sides of the flap 8 are coated with a layer of thermoactive adhesive 11.

FIG. 2 shows an aluminium fixing strip 12 of ladder form, apertures 13 in the strip being dimensioned and spaced so that the strip can be fitted tightly over the series of pillars 9 (FIG. 3). The transversely extending or cross-pieces of the ladder-form fixing strip 12 then extend between the pillars formed by the paired posts 4, 5, and prevent longitudinal displacement of the fixing strip relative to said pillars and longitudinal displacement between the posts 4 and the posts 5, while the longitudinal extending or side-pieces of the ladder-form fixing strip 12 prevent transverse displacement from the face-to-face abutting relation between the posts 4 and posts 5.

In use, the sleeve 1 is opened up and placed about a portion of exposed cable interior (not shown). The two edges 6 and 7 are brought together so that the two series of posts 4 and 5 abut with the flap 8 located inwardly of the edge 6. As shown in FIG. 3, the fixing strip 12 is then pressed over and down to the roots of the upstanding pillars 9. Location of the fixing strip 12 can be performed manually or by means of a comb-like tool (not shown). Location of the strip is facilitated by bounding edges 14 of the apertures 13 being struck up from the plane of the strip 12, this feature also assisting in retention of the strip 12 on the pillars 9.

Retention of the strip 12 may be assisted by "splaying-out" the posts 4 and 5 of each pillar 9. The apertures 13, whose dimensions correspond with those of the posts adjacent the roots thereof, will then have to be forced over the splayed ends of the posts and this will hold the strip 12 in place on the pillars.

To seal the sleeve 1 around the cable, it is heated to beyond its crystalline melting point. The polyethylene sleeve tends to restore to its original circumferential dimension which is arranged to be slightly less than the circumference of the cable interior whereby the polyethylene seals tightly over the interior to protect it, for example, from ingress of moisture.

The pillars 9 are prevented from pulling out of the apertures 13 during the shrinkdown process by the struck-up edges 14. Retention can be further improved by ensuring when fabricating the sleeve material that the posts 4 and 5 are radially outwardly stretched. If during the shrinkdown process the pillars 9 are heated initially they will then, in restoring to their original dimensions, swell laterally so that the bounding edges 14 cut into the pillars 9 to establish a more retentive grip.

Application of heat to the sleeve also activates the thermo-active adhesive layer 11 whereby the sleeve 1 is caused to adhere to the cable. In addition, the flap 8 adheres to the sleeve edge 6 thereby promoting a seal along the edges; this is particularly useful as, following cooling of the sleeve material, the pillars 9 and the fixing strip 12 can be safely cut away so that cable ducts will not be unduly impeded.

Referring now to FIG. 4 there are shown in schematic form four consecutive stages in a method for the production of stock material for fabricating a split sleeve as shown in FIG. 1. At a station A molten thermoplastics 23 is formed into sheet material by a roller 24 having grooves 25 to produce complementary flanges 26. Knives 27 ensure that one flange is at an edge of the stock material and the other flange is spaced from the other edge to produce a flap 28. At station B, the material is stretched in the direction of arrows $S_1$ and the flanges can be stretched in the direction of vertical arrows $S_2$. Simultaneously, the plastics is heated above its crystalline melting point. While maintaining the stretching forces, the material is allowed to cool (station C) and, when cool, the flanges are cut into castellated form by a reciprocating cutter 29 at station D.

Figure 5:
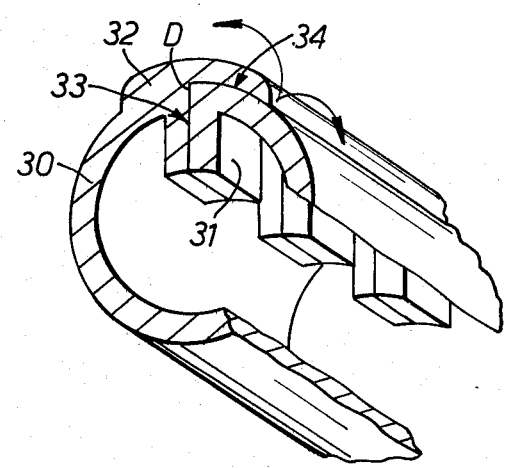
FIG. 5 is a perspective part sectional, part cut-away view of a section of stock material being produced by an alternative method.

FIG. 5 shows a perspective, part sectional, cut-away view of a length of stock material in the course of production by another method. By an extrusion method, tubular polyethylene 30 having a flange 31 extending inwardly from a relatively thick wall region 32 is produced. Operating from inside the tubular polyethylene a cross-cutter (not shown) cuts the flange 31 into a castellated form and a second cutter (not shown) slits 33 the flange and tubular wall to a depth D. A third cutter (not shown) operating from outside the tube slits 34 the thickened region 32 from the tubular wall thereby cleaving the tubular plastics in an L-shape. The split material is turned inside-out to prepare a split sleeve for use in sealing a cable repair etc. Clearly this latter method only lends itself to producing limited integral lengths of stock material.

I claim:

1. A cover formed from dimensionally heat unstable sheet material having first and second opposite edges with first and second edge portions adjacent said first and second edges respectively, said first edge portion carrying adjacent said first edge a first series of mutually spaced posts upstanding from the plane of the sheet at a first side thereof, said second edge portion carrying in spaced relation to said second edge a second series of mutually spaced posts upstanding from the plane of the sheet at said first side thereof thereby providing a sealing flap engageable in underlapping relationship with said first edge portion when said first and second series of posts are juxtaposed to each other, said first and second series of posts being arranged to abut in face-to-face relation in non-interlocking relation to form mutually spaced pillars each made up of a pair of posts respectively from said first and second series, and a separate ladder-form fixing means defining apertures to embrace said pillars to retain said means against longitudinal displacement relative to said pillars and to retain said first and second pairs of posts against longitudinal and transverse displacement relative to each other.

2. A cover as claimed in claim 1 wherein said retaining means is formed from a strip of a rigid material.

3. A cover as claimed in claim 2 in which the bounding edges of the apertures are struck-up from the plane of the strip material.

4. A cover as claimed in claim 1 in which said apertures are rectangular in shape when seen in plan view and are equi-spaced along the length of said strip and in which said pillars are equi-spaced one from another.

5. A cover as claimed in claim 1 in which the posts are splayed-out and in which the apertures are dimensioned to correspond with the portions of the posts adjacent the roots thereof.

6. A cover as claimed in claim 1 wherein one of the surfaces of said sheet material carries a thermo-active adhesive.

* * * * *